B. F. HORTON.
Horse Rake.
No. 73,248.
Patented Jan'y 14, 1868.
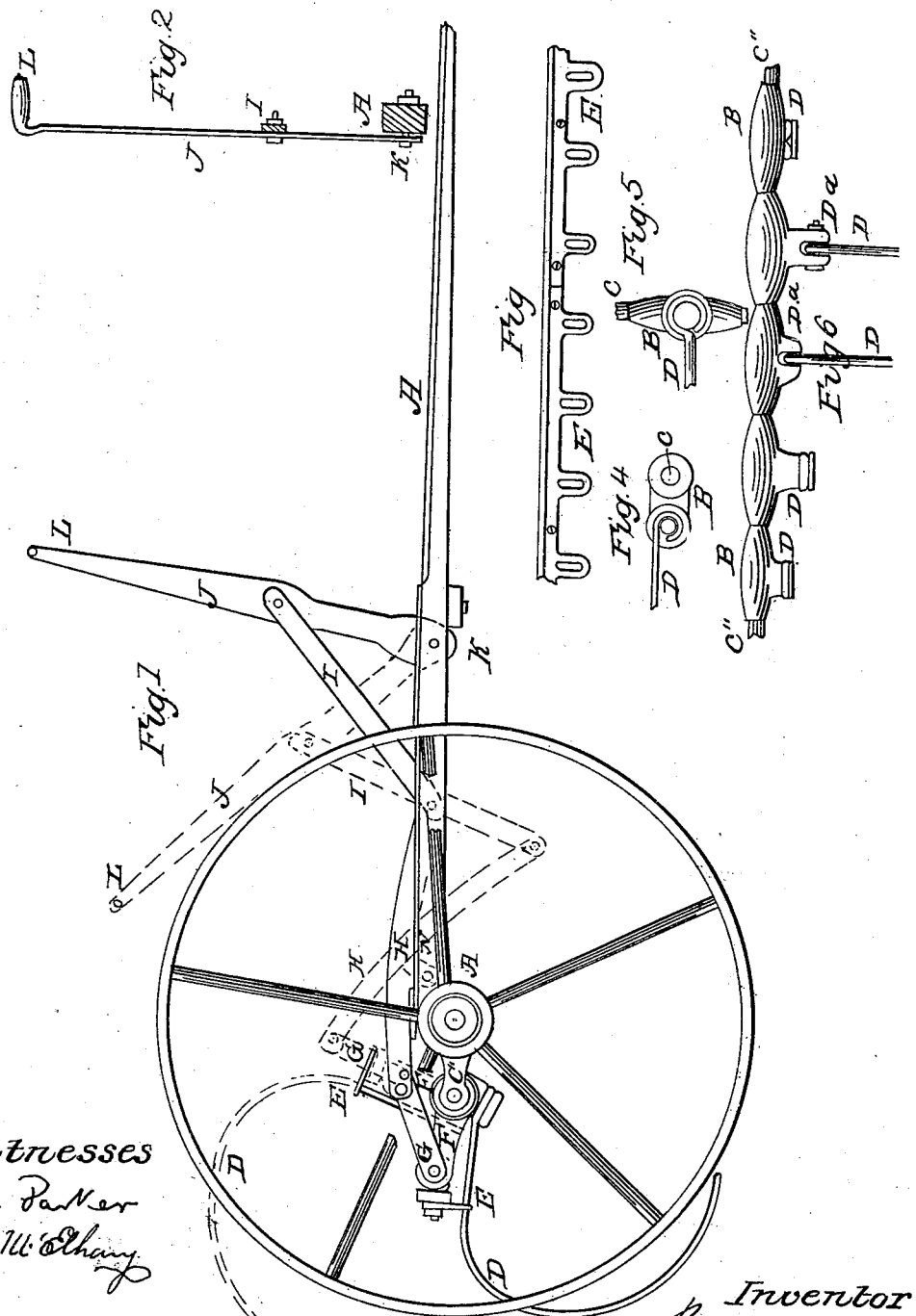

United States Patent Office.

BENJAMIN F. HORTON. OF ITHACA, NEW YORK.

Letters Patent No. 73,248, dated January 14, 1868.

IMPROVEMENT IN HORSE-RAKES.

The Schedule referred to in these Letters Patent and making part of the same.

TO ALL WHOM IT MAY CONCERN:

Be it known that I, BENJAMIN F. HORTON, of Ithaca, Tompkins county, New York, have invented certain Improvements in Horse-Rakes; and I do hereby declare that the following is a full and exact description thereof, reference being had to the accompanying drawings and to the letters thereon.

Figure 1 is a side view of my rake, and

Figures 2, 3, 4, 5, and 6, parts thereof.

My object is to make an easy and sure mechanism to unload the rake, and also to improve the mechanism of the teeth. This I accomplish by an arrangement and adaptation of several levers and connecting-rods, which elevate and lower the teeth, and by a right-angled bend of the top of the hand-lever, so that the hand grasps the handle horizontally, and not perpendicularly, and by a cast-iron plate on the lifting-bar, and by making the teeth-thimbles with side projections, and fastening the teeth to the side projections, and not to the thimbles themselves. These parts and their uses are apparent in the figures, where—

In fig. 1, A A are the thill and body of the rake, on two wheels; and B is the metallic rake-head, supported by the metal studs C', projecting from the axle, and D the teeth, and E the cast-iron loop-plate attached to the wooden loop-bar, and F is the rod or lever that holds the tooth loop-bar to the rake-head, and has the connecting-rod G hinged to it, and H is a lever, pivoted at N, and joined at one end to the rod G, and at the other to the rod I, which rod I is hinged to the hand-lever J. The yellow-colored position of the rake-unloading apparatus is for collecting the hay or other article. The red color shows the rake as unloaded.

In fig. 2, the side of the hand-lever is shown, and the right-angled and horizontal handle. This enables the operator more easily to give the sweep of the hand-lever, in using the rake.

Fig. 3 shows the cast-iron loop-plates on the lifting-bar—a simple, durable, and convenient arrangement.

Fig. 4 shows the thimble B, with the hole C'' in it for the head-rod, and the side projection, with a tooth fastened to it. It is seen in section, and exhibits one of the forms by which I fasten the tooth to the side projections.

Fig. 5 shows another form of fastening the tooth to the side projection.

Fig. 6 shows more clearly the head of the rake. Through the holes C'' is put an iron rod that holds them all. At D D D is seen a projection with a neck, about which the tooth, when heated, is bent. This gives a fastening that prevents, in a great measure, the side motion of the teeth. At D $a$ and D $a$ is seen a hole, cast in the side projection. In one case the tooth is bent, hot, about a circular neck in the same, and in the other, the tooth is held by a bolt and nut on a screw. Further, it will be observed that the lengths of the side projections are not equal.

It is not designed to use diverse lengths in the same rake, but to show that, by diverse lengths, the end of the tooth next to the head is thrown out from the head, at any desirable distance. By this a greater or less degree of quickness in the motion of the tooth is had in the unloading of the rake, and also the teeth can be and are raised higher by the same distance of motion of the hand-lever.

The other uses and advantages of my invention are apparent to those skilled in the art to which it appertains.

Claims.

1. I claim the arrangement of the teeth, and the knobs projecting from the lower sides of the thimbles B substantially as described.

2. The combination and arrangement of the described levers and rods F, G, H, I, and J, substantially as set forth.

3. The combination of the hand-lever J, rod I, pivoted lever H, rod G, lever F, and lifting-bar E, when all are constructed and operated substantially as described.

B. F. HORTON.

Witnesses:
S. J. PARKER,
T. J. McELHENY.